United States Patent [19]

Jacquet

[11] Patent Number: 4,735,231
[45] Date of Patent: Apr. 5, 1988

[54] DEVICE FOR PREVENTING LEAKAGE IN PRESSURE DUCTS

[76] Inventor: Billy Jacquet, Hasselstigen 4, S-171 31 Solna, Sweden

[21] Appl. No.: 6,674
[22] PCT Filed: Apr. 24, 1986
[86] PCT No.: PCT/SE86/00190
 § 371 Date: Dec. 23, 1986
 § 102(e) Date: Dec. 23, 1986
[87] PCT Pub. No.: WO86/06457
 PCT Pub. Date: Nov. 6, 1986

[30] Foreign Application Priority Data

Apr. 24, 1985 [SE] Sweden ............................ 8501995

[51] Int. Cl.⁴ .................................................. F16K 31/02
[52] U.S. Cl. ...................................... 137/459; 137/495; 137/486; 137/487.5; 137/624.12; 73/40.5 R
[58] Field of Search .................. 137/624.11, 624.12, 137/495, 459, 486, 460, 487.5; 73/40.5 R

[56] References Cited

U.S. PATENT DOCUMENTS 4,249,565 2/1981 Brust ................................... 137/495
4,589,435 5/1986 Aldrich ...................... 137/624.11 X Primary Examiner—Alan Cohan
Attorney, Agent, or Firm—Banner, Birch, McKie & Beckett

[57] ABSTRACT

Apparatus for sensing and stopping large and small leakages between one or more tapping locations (6) and a stop valve (2) in a pressurized incoming pipeline (1) for preventing damage due to liquid leaving the line, e.g. water or oil, in buildings or other premises. The apparatus includes a pressure-and time-controlled regulating unit (4) intended for opening and closing the stop valve (2), which is normally closed when tapping does not take place but is opened but is opened when tapping is begun. The regulating unit (4) is connected to a pressure monitor (3), which is adapted for sensing the pressure after the stop valve (2) and giving the regulating unit an opening signal should the pressure fall below a given minimum pressure. Time control of the regulating unit is done with the aid of a series of time circuits (11, 15, 18, 22, 23, 24) arranged for registering different times (A, B, C, D, E) which start when the pressure monitor senses low pressure or one the termination of a preceding time. Control and calculating circuits are arranged for closing the stop valve (2) when previously determined times or time sequences are registered.

11 Claims, 2 Drawing Sheets

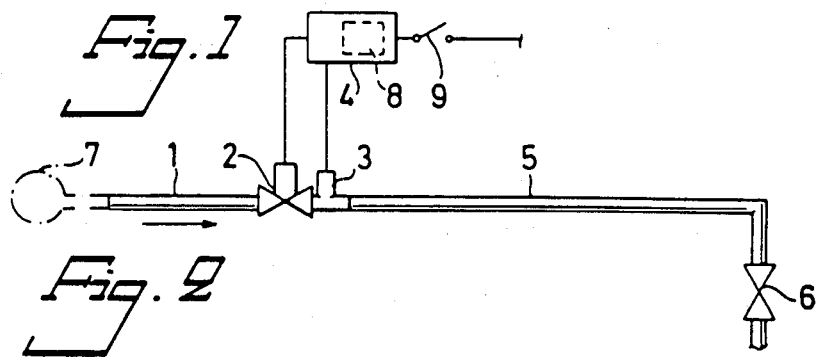
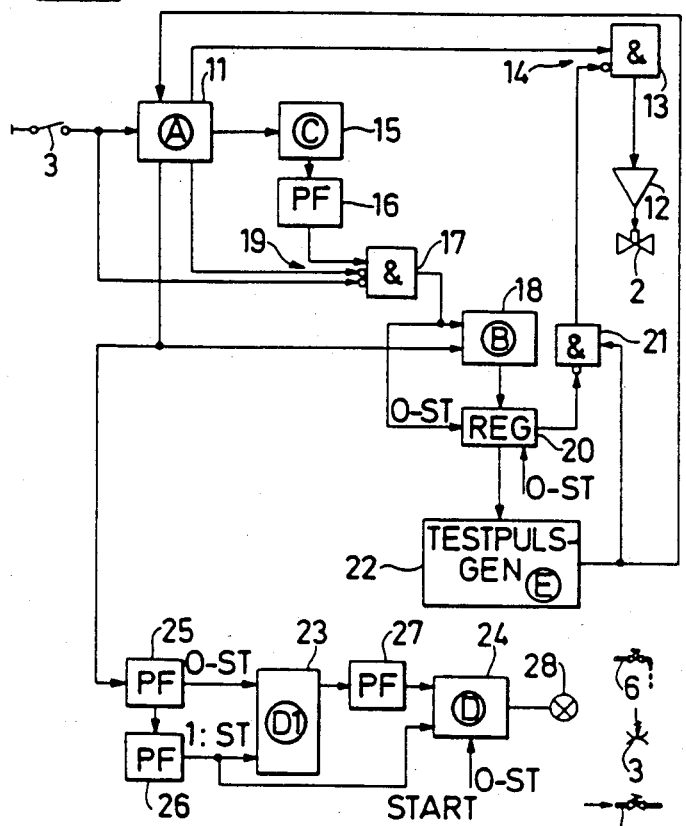
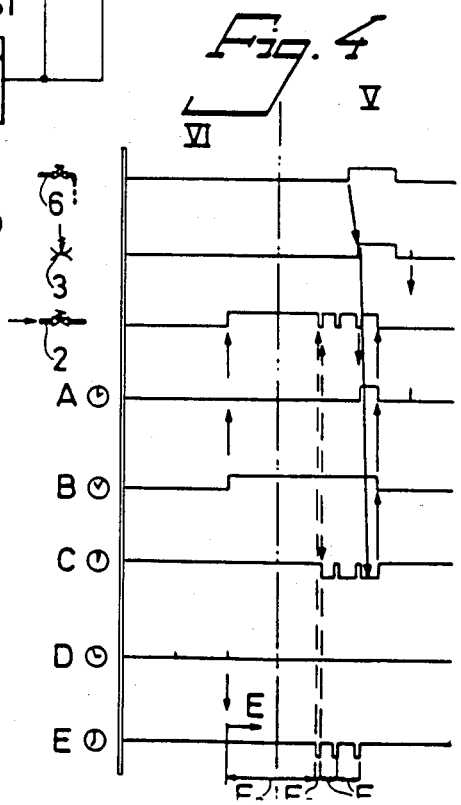

DEVICE FOR PREVENTING LEAKAGE IN PRESSURE DUCTS

The present invention relates to an apparatus for sensing and stopping large and small leakages between one or several tapping locations and a stop valve in an incoming pressurized line.

In water pipes or other lines carrying a medium at increased pressure, unintentional leakage can occur due to leaks which occur suddenly, e.g. hose rupture in a dishwashing machine, or to small leaks. Such small leaks can either be a leaking gasket, an improperly closed tap, or one dripping for some other reason, or a deficiency in water-tightness, e.g. in a pipe joint. Leaks of the last mentioned kind, in particular, can cause great damage if they are not discovered in good time. At present, there is no method of monitoring this type of leakage, which often occurs at places which are not in view, since pipes are often hidden in walls, floors, ceilings etc. Large leakages rapidly give large damage but are also discovered quicker, while small leakages are more difficult to discover, since the leak slowly drains into the building over a long time and is absorbed in floors, ceilings or walls, giving rise to very expensive and extensive damage.

The object of the present invention is therefore to provide an apparatus for preventing leakage, and which is adapted to cut off the flow if a large or small leak occurs. The object is further to prevent such types of damage without obstructing normal tapping of water or otherwise creating substantial inconveniences. This object, as well as further objects and advantages of the invention, will be apparent from the following description. They are achieved by their being given the characterizing features disclosed in the claims.

The invention will now be described in detail with reference to the accompanying drawing on which:

FIG. 1 is a schematic circuit diagram of an apparatus in accordance with the invention.

FIG. 2 is a schematic circuit diagram of a regulating unit in the apparatus according to FIG. 1.

FIG. 4 is a further diagram for describing the inhibiting function and a test function for possible restarting of the system.

Figure 3:
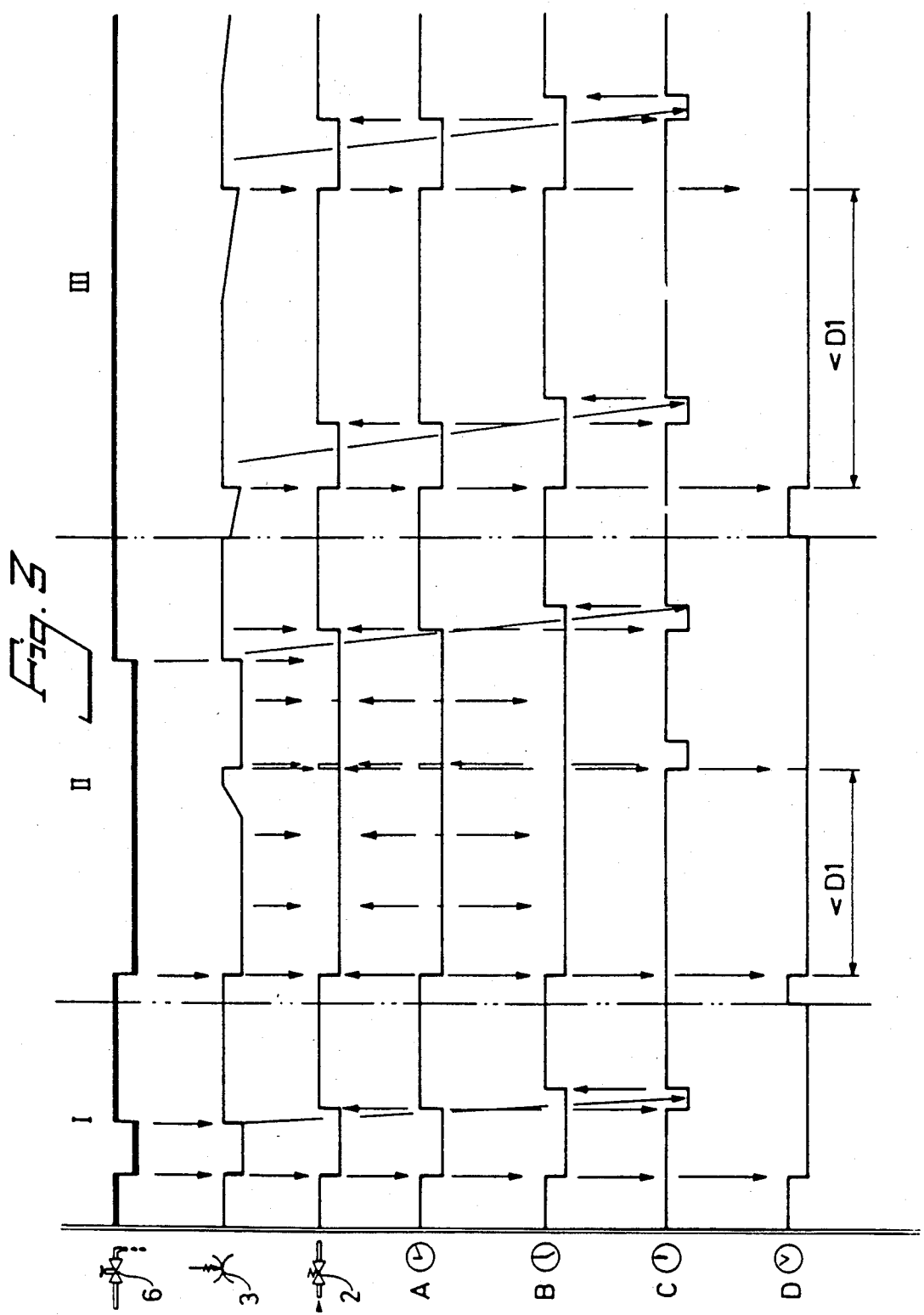
FIG. 3 is a diagram for describing the function of the apparatus when a tap is opened and closed, if the tap is kept open for some time and when there is dripping leakage.

As will be seen from FIG. 1, a stop valve 2, e.g. in the form of a solenoid valve is mounted in an incoming pressurized line 1, supplying medium under pressure. A pressure sensing means 3 in the form of a suitable pressure transducer is arranged in the line after this valve 2, and senses the pressure in the medium after the stop valve. From the sensing device 3 the line, now denoted by 5, continues to a plurality of taps, of which only one 6, is shown on the drawing. The flow in the incoming pressurized line 1 can be provided by connection to a water mains or the like. The flow can also be achieved directly via a motor-driven pump 7, which is coupled in between the stop valve and some source of water.

The pressure sensing means 3 is adjustable for sending a signal when a given minimum pressure is reached. More specifically, an opening signal is then given to a regulating unit 4, which in turn is adapted for opening and closing the stop valve 2. A time registering means 8 in the form of suitable electronic circuits is included in the regulating unit 4, for registering different time sequences after the valve 2 has been opened. The time registering means 8 further initiates pressure sensing via the transducer 3 or closing of the valve 2, which will be described in detail in the following.

The time registering means 8 is adapted to start three different times, A,B,D, when the pressure transducer 3 sends the opening signal. The first time is the opening time A, which keeps the valve 2 open for a given time, irrespective of whether the pressure is low or high. The time A is adjustable to some suitable value within the interval 5–35 seconds, e.g. 20 seconds. The second time is the total time B, which is intended to achieve closure of the valve 1, if water has been running uninterruptedly during the whole of this time B. The time B is given a maximum value of 10 minutes, for example. The third time is a monitoring time D, which is intended to check whether dripping or minor leakage is present. This time D is in operation for a very long time, e.g. two hours or more, after which closing signals can be sent to the valve 2, or be used to achieve some kind of warning signal. The total time B is used to ensure that the water supply is closed off for an appreciable leakage, while the monitoring time D gives closure or a warning signal for very small leakage.

The system would be inconvenient to use in practice if only the times B and D were used. The time registering means therefore includes time circuits for measuring three control times C,E, and D1, which together with the opening time A result in that all tapping of water can be done without extra trouble. If the pressure transducer 3 senses a high pressure when the time A goes towards its termination, a closing signal is sent to the valve 2. Simultaneously, the time registering means 8 starts a first control time C, which is adjustable to a given "watching time" of 15 seconds for instance. If the pressure transducer 3 were to sense that the pressure drops during this time, the valve 1 is controlled to open again. On the other hand, if the pressure were not to fall during the time C, the valve 1 will remain closed. The control time C controls the total time B by the condition that the time B is set to zero if any pressure drop cannot be sensed during the time C, while the total time otherwise continues further towards its termination. If on the other hand, the pressure during a tapping-off is low the whole time, or is low immediately before the termination of the time A, no order is sent from the regulating unit 4 to close the valve 1, and it can then be open during a complete such tapping-off. For larger flows, the valve 1 will thus be open the whole time during which tapping takes place, right up until the latter ceases, or the total time B comes to an end and closes the valve 1. The first control time C thus has the task of interrupting the total time B after each separate tapping-off. The monitoring time D is adapted to be set to zero if the pressure during a given, set, second longer control time D1 does not become low before this time comes to an end. On the other hand, if the pressure continues to be low during the time D1, the monitoring time D continues towards its termination, which as mentioned can directly result in that the valve 2 is closed or a signal lamp is illuminated, for example. The control time D1 is set at an estimated time between two pressure drops, preferably 10 minutes.

When the total time B has run out, the stop valve 2 is closed and further tapping-off is also disabled. Tapping-off of long duration can sometimes be quite normal, however, e.g. extensive showering or garden watering etc, and for enabling continued tapping-off at such occasions a resetting means is arranged for readily restarting the system. The resetting means has a further time registering means for registering a second monitoring time E, which starts at the same instant as the total time B terminates. The monitoring time E is intended to cause resetting of the entire system if pressure is once again built up in the line, and remains there during a given third control time E1 of 15-30 seconds. Testing the pressure is performed by the valve 2 being controlled to open after a given time E2 after the start of the time E. The valve is kept open during a time E3 which would normally be required for pressurizing the line if there were no leakages, usually only a few seconds. This is repeated up to the termination of the time E, when the valve 2 is given the final order to close, providing pressure has not once again been built up in the line. When the valve finally closes, it will remain in this position until it is reset via some manual measure.

The apparatus also includes a switch 9, with the aid of which the regulating unit 4 can be disconnected so that the valve 2 can be purely manually locked in the open or closed position. This can be practical during a more extensive absence from the home or if a very long tapping-off is going to be performed knowingly.

The regulating unit 4 can suitably be constructed in the way apparent from FIG. 2. The pressure monitor 4 is here arranged to activate a time circuit 11 during a time corresponding to the opening time A. If the pressure is low when this time comes to an end, the time circuit is kept in its activated state as long as the pressure monitor indicates this low pressure. Input signals depart from the time circuit 11 to an amplifier 12 arranged for opening and closing the solenoid valve 2. When the time circuit 11 is activated, the input signals can pass an AND circuit 13. This circuit can be blocked by an inhibiting signal 14. The amplifier 12 is adapted such that the solenoid valve 2 is opened if an output signal is obtained from the AND circuit 13.

When the time circuit 11 returns once again to the inactive state, a second time circuit 15 is activated for controlling the first control time C. A pulse former 16 is arranged for sending an interrogation pulse asking whether the pressure is high or low when the control time C runs out. The pulse can pass through an AND circuit 17 if the pressure monitor 3 registers high pressure. The output signal from the circuit 17 is used for resetting a third time circuit 18, the function of which will be described later. An inhibiting signal 19 from the first time circuit 11 can block die AND circuit 17 if the time circuit 11 becomes activated during the control time C. The reason for this will be apparent from the following.

The time circuit 18 determines how long the solenoid valve shall be normally open, i.e. the total time B. The circuit 18 is activated at the same instant as the first time circuit 11 is started. A blocking register 20 is arranged for setting to ONE when the total time B has been reached, providing the time circuit 18 has not been reset previously. The ONE setting of the register 20 results in that the inhibiting signal 14 controlled from it via an AND circuit 21 blocks the output signal from the AND circuit 13, so that the solenoid valve 2 is closed. If the flow is low when the time A has run out, the valve 2 will close. The pressure subsequently drops so that the pressure monitor 3 closes and the valve 2 opens, but since tapping-off is low, the pressure is raised immediately and is high when the interrogation pulse from the pulse former 16 comes. The inhibiting signal 19 results in that the total time circuit 18 retains its ONE setting in spite of the pressure being high, which is correct since tapping-off is in progress.

When the blocking register 20 is set to ONE, a test pulse generator 22 is started, which gives short opening pulses E2 of about 2 seconds' duration. These pulses are sent with the time interval E1, i.e. 15.30 seconds, and open the solenoid valve 2 via the two AND circuits 21, 13 as well as starting the time circuit 11 for the opening time A. If the pressure monitor registers high pressure on pressurizing the piping system, the register 20 will be set to zero from the AND circuit, after which the system is once again ready for a new start. The test pulse generator 22 can be programmed for a given number of test pulses, e.g. 5-10 pulses, corresponding to the running time of the third control time E. If some high pressure is not registered during these intervals, the blocking register 20 will remain set to ONE, which disables tapping-off. The blocking register 20 can be set to zero manually, however, so that tapping-off can be resumed.

The monitoring of drips takes place with the help of two further time circuits 23, 24, which register the second control time D1 and the monitoring time D, respectively. When the time circuit 11 for the opening time A is activated, a pulse former 25 sends a pulse which sets the time circuit 23 to zero and somewhat later a pulse former 26 sends a pulse which starts the time circuits 23 and 24. The control time circuit 23 is set to 10 minutes, for example, and if the time between pressure drops is longer, the closing time for the circuit will be reached. This activated a pulse former 27 which then sets the monitoring time circuit 24 to zero. If the pressure drops take place at closer intervals than the control time D1, the pulse former 27 will not be activated, which in turn signifies that the monitoring time D will reach its set termination time, about 2 hours. A signal lamp 28 is then illuminated, thus indicating that dripping has occurred during the set monitoring time D. The time circuit 24 may also be set to zero manually, the signal lamp 28 then being extinguished.

The function of the apparatus during different tapping sequences will now be described in connection with the diagrams in FIGS. 3 and 4. The diagrams illustrate time axes seen from above for a tap 6, the pressure sensor 3, stop valve 2, opening time A, the first control time C and the monitoring time D. In addition, a time axis is shown in FIG. 4 for the third control time F. The diagrams show whether the tap is closed or open, whether the pressure transducer senses high or low pressure, whether the stop valve is open or closed and whether the respective time runs out or not. The series of events is illustrated Sequence I in FIG. 3, when a tap 6 is opened and closed once again. The interacting order between the different happenings in the sequence is illustrated by arrows and numerals. When the tap is opened, the pressure monitor registers a pressure drop, the stop valve being controlled to open. Simultaneously the opening time A, total time B and monitoring time D are started. After a short time the tap is closed, and the pressure monitor then senses a higher pressure, resulting in that the opening A, when it comes to an end, can close the stop valve and simultaneously start the first control time C. This does not sense any pressure drop during its sequence, and the total time can thus be finally set to zero. The monitoring time D for dripping continues to its termination. No pressure drop during the second control time D1 is indicated during the illustrated sequence.

The next Sequence II illustrates the function of the apparatus if a tap is kept open for a long time. The sequence is started here in the same way as previously, but since the pressure transducer senses a low pressure just before the opening time A runs out, the stop valve is not closed here and neither is the control time C started. For different reasons, periods of high pressure may occur during the time tapping-off is in progress. this result then in that the opening time A gives the stop valve order to close simultaneously as the control time C is started. The pressure drops once again due to tapping-off, which causes the pressure sensor or pressure monitor to close the stop valve once again. When tapping-off is terminated, the sequence will be the same as in the previous Sequence I. The monitoring time D for dripping will continue, since a pressure drop has been indicated within the control time D1.

If drop leakage occurs, the sequence will be as illustrated in Sequence III in FIG. 3. Here the pressure monitor registers a high pressure, which subsequently decreases slowly, and when the pressure has decreased sufficiently the stop valve is opened and the times A, B, C are started in the usual manner. When the time A has run out, the solenoid valve is once again closed and the control time C is started, and since it does not sense any pressure drop during its running time, the total time B is interrupted. The leakage can thus not be stopped with the aid of the total time B, which would be the case if the pressure decrease were greater. Before the second control time D1 has run out, the pressure has however decreased so much that the pressure monitor once again opens the valve and starts the times A and B. This results in that the monitoring time D is not set to zero but runs further until a number of such long pressure drops have occurred, and as mentioned, the stop valve may then be closed, or some warning signal be sent. By varying the magnitude of the second control time D1 the system can be set to a suitable sensitivity.

Sequence IV, for compulsory closure after a long time of tapping-off will be seen from FIG. 4, as well as Sequence V for the function of the resetting means when the system has been preliminarily closed. When tapping-of occurs for a very long time, it will be interrupted at the termination of the total time B, as mentioned. The same thing takes place if a greater leakage occurs. Thus, the stop valve 2 is closed and the third control time E is started, resulting in that the opening time A will continue in spite of the valve 2 being closed. The time E is intended to sense whether any pressure once again occurs during a given time, e.g. 5 minutes, after closure. When the time E has reached a certain time, E2, e.g. 30 seconds, the stop valve is opened a few seconds, E3, whereafter the pressure change during the time period E1 is sensed. It will be seen from the diagram V that no high pressure can be sensed during the time E1 before the tap is closed once again, all times then being set to zero and tapping-off can start once again. On the other hand, if there were a leak or a tap had been left open for a long time, a new pulse would be sent to the stop valve after the termination of the first time E1, this valve then opening and closing so that a new test period could begin. This can be repeated a number of times before the total control time E runs out and finally closes the entire system.

The invention is of course not restricted to the illustrated embodiment, and can be varied in many ways within the scope of the following claims.

I claim:

1. Apparatus for sensing and stopping large and small leakages between one or more tapping locations (6) and a stop valve (2) in an incoming pressurized pipe line (1), including a pressure- and time-controlled regulating unit (4) for opening and closing the stop valve (2), where a pressure sensing means (3) is arranged downstream of the stop valve (2) to give the regulating unit an opening signal when the pressure falls below a given minimum pressure, and where the regulating unit includes time registering means (11,15,18, 22,23,24) for achieving time-controlled closing signals to the valve (2), characterized in that the time registering means is adapted to start an opening time (A) and a total time (B) when the pressure sensing means (3) sends an opening signal and to send a closing signal when the opening time (A) has come to an end, in that the regulating unit (4) simultaneously senses via the pressure sensing means (3) the pressure change during a given first control time (C), in that the total time (B) continues to run if a pressure drop is sensed during the control time (C) but is otherwise broken off, in that the regulating unit (4) blocks sending the opening signals further to the stop valve (2) when the total time (B) has come to an end, and in that the regulating unit (4) has means (23-27) for sensing the number of opening signals from the pressure sensing means (3) during a given longer monitoring time (D) such that if certain given signal conditions are met there is achieved a signal indicating leakage.

2. Apparatus as claimed in claim 1, characterize d in that the regulating unit (4) causes the pressure sensing means (3) to sense the pressure immediately before the termination of the opening time (A) such that if the pressure falls below a given value it does not send said closing signal when the opening time (A) has come to an end.

3. Apparatus as claimed in either of claims 1 or 2, characterized in that the regulating unit (4) interrupts the sensing during said monitoring time (D) if no opening signal is obtained within a second longer control time (D1).

4. Apparatus as claimed in claim 1 characterized in that the regulating unit (4) senses and stores the time intervals between the opening signals such as to achieve said leakage indicating signal on recognition of repetitions of the same time interval.

5. Apparatus as claimed in claim 1 characterized in that a switch (9) is connected to the regulating unit (4) for manual opening and closing of the stop valve (2).

6. Apparatus as claimed in claim 1 characterized in that the regulating unit (4) includes a resetting means (20) for temporarily inhibiting blocking of the opening signals to the stop valve (2).

7. Apparatus as claimed in claim 6, characterized in that the resetting means (20) has time registering means for registering a second monitoring time (E), starting at the time for termination of the total time (B) and in that the resetting means cancels blocking of the opening signals if the pressure sensing means (3) does not sense any pressure decrease during a given third control time (E1).

8. Apparatus as claimed in claim 7, characterize d in that the regulating unit (4) reblocks the opening signals to the stop valve (2) if a given number of pressure decreases is sensed during said second monitoring time (E).

9. Apparatus as claimed in claim 1 characterized in that the flow in the incoming pressurized pipe line (1) is provided by an exterial pump motor (7) and in that the regulating unit (4) is adapted for starting and stopping the motor.

10. Apparatus as claimed in claim 1 characterized by means responding to said leakage indicating signal for providing a warning signal.

11. Apparatus as claimed in claim 1 characterized by means responding to said leakage indicating signal for blocking transmission of the opening signals to the stop valve (2).

* * * * *